United States Patent
Kim et al.

(10) Patent No.: US 9,947,228 B1
(45) Date of Patent: *Apr. 17, 2018

(54) METHOD FOR MONITORING BLIND SPOT OF VEHICLE AND BLIND SPOT MONITOR USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,394

(22) Filed: Oct. 5, 2017

(51) Int. Cl.
  *G08G 1/16* (2006.01)
  *G08G 1/04* (2006.01)
  (Continued)

(52) U.S. Cl.
  CPC ......... *G08G 1/167* (2013.01); *G06K 9/00805* (2013.01); *G06K 9/34* (2013.01);
  (Continued)

(58) Field of Classification Search
  CPC .. G06N 3/08; G06N 3/02; G06K 9/66; G06K 9/6256; G06K 9/4604; G06K 9/00288;
  (Continued)

(56) References Cited

PUBLICATIONS

Girshick, Ross. "Fast r-cnn." Proceedings of the IEEE international conference on computer vision. 2015.*
(Continued)

*Primary Examiner* — Stephen R Koziol
*Assistant Examiner* — Raphael Schwartz
(74) *Attorney, Agent, or Firm* — Husch Blackwell LLP (57) ABSTRACT

A method of monitoring a blind spot of a monitoring vehicle by using a blind spot monitor is provided. The method includes steps of: the blind spot monitor (a) acquiring a feature map from rear video images, on condition that video images with reference vehicles in the blind spot are acquired, reference boxes for the reference vehicles are created, and the reference boxes are set as proposal boxes; (b) acquiring feature vectors for the proposal boxes on the feature map by pooling, inputting the feature vectors into a fully connected layer, acquiring classification and regression information; and (c) selecting proposal boxes by referring to the classification information, acquiring bounding boxes for the proposal boxes by using the regression information, determining the pose of the monitored vehicle corresponding to each of the bounding boxes, and determining whether a haphazard vehicle is located in the blind spot of the monitoring vehicle.

28 Claims, 8 Drawing Sheets

(51) Int. Cl.
*G06K 9/00* (2006.01)
*G06K 9/34* (2006.01)
*G06K 9/46* (2006.01)
*G06K 9/48* (2006.01)
*B60Q 9/00* (2006.01)

(52) U.S. Cl.
CPC ........... *G06K 9/4623* (2013.01); *G06K 9/481* (2013.01); *G08G 1/04* (2013.01); *B60Q 9/008* (2013.01)

(58) Field of Classification Search
CPC .... G06K 9/00744; G06K 9/46; G06K 9/6267; G06T 3/4046
See application file for complete search history.

(56) References Cited

PUBLICATIONS

Ren, Shaoqing, et al. "Faster R-CNN: Towards real-time object detection with region proposal networks." Advances in neural information processing systems. 2015.*

Li, Bo, et al. "Object Detection via Aspect Ratio and Context Aware Region-based Convolutional Networks." Mar. 2017.*

* cited by examiner

METHOD FOR MONITORING BLIND SPOT OF VEHICLE AND BLIND SPOT MONITOR USING THE SAME

FIELD OF THE INVENTION

The present invention relates to a method for monitoring a blind spot of a vehicle and a blind spot monitor using the same; and more particularly, to the method of (a) acquiring at least one feature map from a rear video image if the rear video image is acquired from a monitoring vehicle in a driving state, (b) acquiring m proposal boxes corresponding to one or more objects located in the rear video image, (c) acquiring feature vectors each of which corresponds to each of the m proposal boxes by applying pooling operation to each area, on the feature map, corresponding to the m proposal boxes, (d) inputting each of the feature vectors corresponding to each of the m proposal boxes into a first FC layer to acquire (d-1) each of first classification scores for each of first kinds of class, which correspond to each of the m proposal boxes, to confirm whether the objects are monitored vehicles, and (d-2) each of second classification scores for each of second kinds of class, which correspond to each of the m proposal boxes, to confirm poses of the objects, (e) selecting n proposal boxes, which have probabilities over a certain threshold to be regarded as including the monitored vehicle, among the m proposal boxes by referring to the first classification scores, (f) acquiring n bounding boxes, each of which corresponds to each of the n proposal boxes, by referring to regression information corresponding to each of the n proposal boxes, (g) determining the pose of the monitored vehicle corresponding to each of at least some of the n bounding boxes by referring to the second classification scores, and (h) determining whether a haphazard vehicle is located in a blind spot of the monitoring vehicle by referring to at least some of the n bounding boxes and the pose of the monitored vehicle, and the blind spot monitor using the same.

BACKGROUND OF THE INVENTION

A subject vehicle has a side view mirror for each side thereof and a rear-view mirror at the front center of its cabin for a good field of view of the side and the rear needed for a change of lanes by a driver.

Although the side view mirror is used for seeing each side and the rear thereof, the subject vehicle has a blind spot where the driver cannot see a nearby vehicle or any other objects that are very close thereto.

This has been a problem because there can be an accident with the nearby vehicle in the blind spot if the driver changes lanes without seeing the nearby vehicle.

To prevent such a problem, the driver sometimes put a convex mirror onto a corner of the side view mirror, which enables the driver to see the blind spot.

However, even when the convex mirror is added onto the side view mirror, the driver must see the blind spot with his/her own eyes to change lanes, which puts further strain to the driver, and there may exist part of the blind spot that still cannot be seen through the convex mirror even if the driver alters his/her head position.

To prevent this, a blind spot monitoring system is suggested recently that aims to prevent accidents from happening when the driver changes lanes, by providing the driver with information on a detection of a monitored vehicle located in the blind spot or approaching the blind spot through a sensor placed at the rear of a monitoring vehicle.

Especially, blind spot monitoring systems using a vision sensor generally adopt various algorithms capable of detecting objects based on visual information.

However, those algorithms may show limited detection rates constrained by external environment, shape of the objects, and a configuration of a system. Because an accurate detection requires a number of visual processing, a computational load is very heavy. Therefore, real-time detection may be difficult in an embedded system due to limited processing resources.

As one example of detecting the monitored vehicle using the vision sensor, there is an optical flow method which expresses movement of visual pixels by motion vectors. However, an algorithm for recognition of the monitored vehicle using the optical flow method has much dependence on a change of a state of a background and a visual noise, and requires an enormous computational load, therefore, real-time detection of the monitored vehicle is not easy.

Further, a conventional blind spot monitoring system using the vision sensor has a problem of false alarm because the system gives a mindless warning of the monitored vehicle located in the blind spot, without taking into consideration of driving environment of the monitoring vehicle and the monitored vehicle.

For example, the monitored vehicle on the same lane following the monitoring vehicle on a curved road is falsely detected as located in the blind spot, and the monitored vehicle traveling in the opposite direction on the opposite side of the lane is also falsely detected as located in the blind spot.

SUMMARY OF THE INVENTION

It is an object of the present invention to solve all the aforementioned problems.

It is another object of the present invention to detect a haphazard vehicle located in a blind spot with ease.

It is still another object of the present invention to detect the haphazard vehicle located in the blind spot without regard to driving environment.

It is still yet another object of the present invention to provide an algorithm which requires smaller computation for detection of the haphazard vehicle located in the blind spot.

It is still yet another object of the present invention to detect the haphazard vehicle located in the blind spot in real-time without regard to a change of a state of a background and a visual noise.

It is still yet another object of the present invention to detect the haphazard vehicle located in the blind spot accurately using a convolutional neural network (CNN).

It is still yet another object of the present invention to detect the haphazard vehicle located in the blind spot according to the driving environment of the monitoring vehicle and the monitored vehicle.

In accordance with one aspect of the present invention, there is provided a method for monitoring a blind spot of a vehicle, including steps of: (a) a blind spot monitor acquiring or supporting another device to acquire at least one feature map from a rear video image if the rear video image is acquired from a monitoring vehicle in a driving state; (b) the blind spot monitor performing or supporting another device to perform (i) a process of acquiring m proposal boxes corresponding to one or more objects located in the rear video image, (ii) a process of acquiring feature vectors each of which corresponds to each of the m proposal boxes by applying pooling operation to each area, on the feature map, corresponding to the m proposal boxes, and (iii) a process of inputting each of the feature vectors corresponding to each of the m proposal boxes into a first FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects; and (c) the blind spot monitor performing or supporting another device to perform (i) a process of selecting n proposal boxes, which have probabilities over a certain threshold to be regarded as including the monitored vehicle, among the m proposal boxes by referring to the first classification scores, (ii) a process of acquiring n bounding boxes, each of which corresponds to each of the n proposal boxes, by referring to regression information corresponding to each of the n proposal boxes, (iii) a process of determining the pose of the monitored vehicle corresponding to each of at least some of the n bounding boxes by referring to the second classification scores, and (iv) a process of determining whether a haphazard vehicle is located in a blind spot of the monitoring vehicle by referring to at least some of the n bounding boxes and the pose of the monitored vehicle.

In accordance with another aspect of the present invention, there is provided a blind spot monitor for monitoring a blind spot of a vehicle, including: a communication part for acquiring or supporting another device to acquire a rear video image or its corresponding at least one feature map, wherein the rear video image is acquired from a monitoring vehicle in a driving state; a processor for performing or supporting another device to perform (i) a process of acquiring m proposal boxes corresponding to one or more objects located in the rear video image by using the feature map acquired from the communication part or the feature map calculated by applying one or more convolution operations to the rear video image map acquired from the communication part, (ii) a process of acquiring feature vectors each of which corresponds to each of the m proposal boxes by applying pooling operation to each area, on the feature map, corresponding to the m proposal boxes, (iii) a process of inputting each of the feature vectors corresponding to each of the m proposal boxes into a first FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects, (iv) a process of selecting ti proposal boxes, which have probabilities over a certain threshold to be regarded as including the monitored vehicle, among the m proposal boxes by referring to the first classification scores, (v) a process of acquiring n bounding boxes, each of which corresponds to each of the n proposal boxes, by referring to regression information corresponding to each of the n proposal boxes, (vi) a process of determining the pose of the monitored vehicle corresponding to each of at least some of the n bounding boxes by referring to the second classification scores, and (vii) a process of determining whether a haphazard vehicle is located in a blind spot of the monitoring vehicle by referring to at least some of the n bounding boxes and the pose of the monitored vehicle.

In accordance with still another aspect of the present invention, there is provided a method for monitoring a blind spot of a vehicle, including steps of: (a) a blind spot monitor acquiring or supporting another device to acquire at least one feature map from a rear video image if the rear video image is acquired from a monitoring vehicle in a driving state; (b) the blind spot monitor performing or supporting another device to perform (i) a process of acquiring m proposal boxes corresponding to one or more objects located in the rear video image, (ii) a process of acquiring feature vectors each of which corresponds to each of the m proposal boxes by applying pooling operation to each area, on the feature map, corresponding to the m proposal boxes, and (iii) a process of inputting each of the feature vectors corresponding to each of the m proposal boxes into an FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects; and (c) the blind spot monitor performing or supporting another device to perform (i) a process of determining specific proposal boxes as including the monitored vehicles among the m proposal boxes by referring to the first classification scores for each of first kinds of class, (ii) a process of selecting i proposal boxes determined as including at least one specific monitored vehicle whose pose corresponds to a traveling direction of the monitoring vehicle among the specific proposal boxes by referring to the second classification scores for each of the second kinds of class, (iii) a process of acquiring each of i bounding boxes corresponding to each of the i proposal boxes by referring to regression information corresponding to each of the i proposal boxes, and (iv) a process of determining whether there is at least one bounding box located in the blind spot of the monitoring vehicle among the i bounding boxes to thereby determine whether at least one haphazard vehicle is located in the blind spot.

In accordance with still yet another aspect of the present invention, there is provided a blind spot monitor for monitoring a blind spot of a vehicle, including: a communication part for acquiring or supporting another device to acquire a rear video image its corresponding at least one feature map, wherein the rear video image is acquired from a monitoring vehicle in a driving state; a processor for performing or supporting another device to perform (i) a process of acquiring m proposal boxes corresponding to one or more objects located in the rear video image by using the feature map acquired from the communication part or the feature map calculated by applying one or more convolution operations to the rear video image map acquired from the communication part, (ii) a process of acquiring feature vectors each of which corresponds to each of the m proposal boxes by applying pooling operation to each area, on the feature map, corresponding to the m proposal boxes, and (iii) a process of inputting each of the feature vectors corresponding to each of the m proposal boxes into an FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects (iv) a process of determining specific proposal boxes as including the monitored vehicles among the m proposal boxes by referring to the first classification scores for each of first kinds of class, (v) a process of selecting i proposal boxes determined as including at least one specific monitored vehicle whose pose corresponds to a traveling direction of the monitoring vehicle among the specific proposal boxes by referring to the second classification scores for each of the second kinds of class, (vi) a process of acquiring each of i bounding boxes corresponding to each of the i proposal boxes by referring to regression information corresponding to each of the i proposal boxes, and (vii) a process of determining whether there is at least one bounding box located in the blind spot of the monitoring vehicle among the i bounding boxes to thereby determine whether at least one haphazard vehicle is located in the blind spot.

In addition, recordable media that are readable by a computer for storing a computer program to execute the method of the present invention is further provided.

BRIEF DESCRIPTION OF THE DRAWINGS

The following drawings to be used to explain example embodiments of the present invention are only part of example embodiments of the present invention and other drawings can be obtained based on the drawings by those skilled in the art of the present invention without inventive work.

DETAILED DESCRIPTION OF THE PREFERRED EMBODIMENTS

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 1:
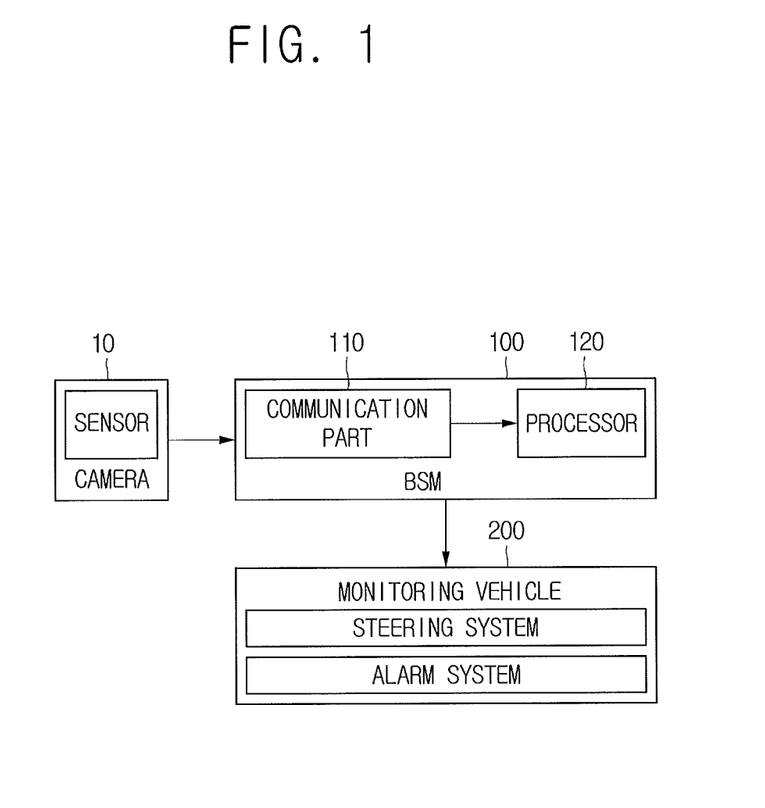
FIG. 1 is a block diagram schematically illustrating a blind spot monitoring system in accordance with one example embodiment of the present invention.

First of all, FIG. 1 is a block diagram schematically illustrating a blind spot monitoring system in accordance with one example embodiment of the present invention. By referring to FIG. 1, the blind spot monitoring system may include a blind spot monitor (BSM) 100 and a monitoring vehicle 200. For reference, the blind spot monitor 100 may be installed on the monitoring vehicle 200, but it is not limited to this. Further, by referring to FIG. 1, a vision sensor 10, e.g., a camera, is illustrated as communicating with the blind spot monitor 100, however, it may be included in the blind spot monitor 100 or the monitoring vehicle 200.

The blind spot monitor 100 may detect another vehicle, i.e., a monitored vehicle, located in a blind spot of the monitoring vehicle 200 or approaching the blind spot. As an example, the blind spot monitor 100 may determine whether a haphazard vehicle is located in the blind spot by analyzing at least one rear video image acquired from the monitoring vehicle 200 using the camera.

Then, the monitoring vehicle 200 may be prevented from changing lanes in a direction to the blind spot where the haphazard vehicle is determined as located, or may allow an alarm system to warn a driver of a fact that the haphazard vehicle is in the blind spot, by referring to information on a steering system and information transmitted from the blind spot monitor 100. Especially, in case the monitoring vehicle 200 is an autonomous vehicle, it may determine whether to change lanes while driving by referring to information on driving environment and information on the haphazard vehicle in the blind spot received from the blind spot monitor 100.

Figure 2:
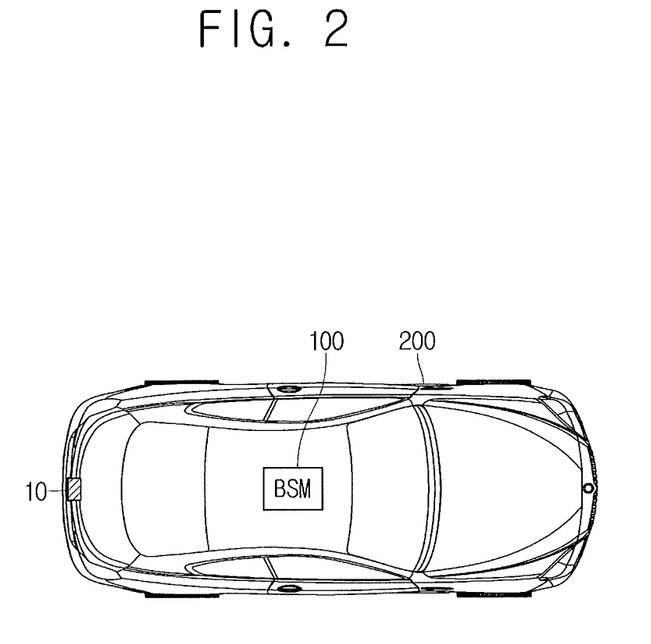
FIG. 2 is a diagram schematically illustrating a monitoring vehicle with the blind spot monitoring system in accordance with one example embodiment of the present invention.

Further, the blind spot monitor 100 may include a communication part 110 that acquires the rear video image from the monitoring vehicle 200 in a driving state by using the vision sensor 10, and a processor 120 that determines whether the haphazard vehicle is in the blind spot of the monitoring vehicle 200 in the driving state by analyzing the acquired rear video image. Herein, the vision sensor 10, installed on an arbitrary place of the monitoring vehicle 200 as can be seen in FIG. 2, may capture video of a rear view thereof, and may include an optical sensor, e.g., a charge-coupled device (CCD), a complementary metal-oxide-semiconductor (CMOS), or an image capturing device.

In accordance with one example embodiment of the present invention, the processor 120 may perform processes of (i) acquiring at least one feature map from the acquired rear video image, (ii) acquiring m proposal boxes corresponding to at least one object in the rear video image, (iii) applying pooling operation to each area, corresponding to the m proposal boxes, on the feature map, and (iv) acquiring each of feature vectors corresponding to each of the m proposal boxes. Further, the processor 120 may input each of the feature vectors corresponding to each of the m proposal boxes into a first FC layer to acquire (i) each of first classification scores for each of first kinds of class, which correspond to each of the m proposal boxes, to confirm whether the object is a monitored vehicle, and (ii) each of second classification scores for each of second kinds of class, which correspond to each of the m proposal boxes, to confirm a pose of the object. Thereafter, the processor 120 may perform processes of (i) selecting n proposal boxes, which have probabilities over a certain threshold to be regarded as including the monitored vehicle, among the m proposal boxes by referring to the first classification scores, (ii) acquiring n bounding boxes, each of which corresponds to each of the n proposal boxes, by referring to regression information for vehicles which corresponds to each of the n proposal boxes, (iii) determining the pose of the monitored vehicle corresponding to each of at least some of the n bounding boxes by referring to the second classification scores, and (iv) determining whether a haphazard vehicle is located in the blind spot of the monitoring vehicle 200 by referring to at least some of the n bounding boxes and the pose of the monitored vehicle. That is, the monitored vehicle in the blind spot may be classified into the haphazard vehicle or not by referring to at least some of the n bounding boxes and the pose of the monitored vehicle. Herein, the first kinds of the class may be used for determining what the detected object is. For example, the first kinds may include a vehicle class, a pedestrian class, a motorcycle class, and a dog class, etc. Also, the regression information for vehicles may be information corresponding to the vehicle class in the first kinds of the class, acquired by regression.

A method for monitoring whether the haphazard vehicle is located in the blind spot of the monitoring vehicle is explained more specifically by referring to FIGS. 3 and 4 as below.

Figure 3:
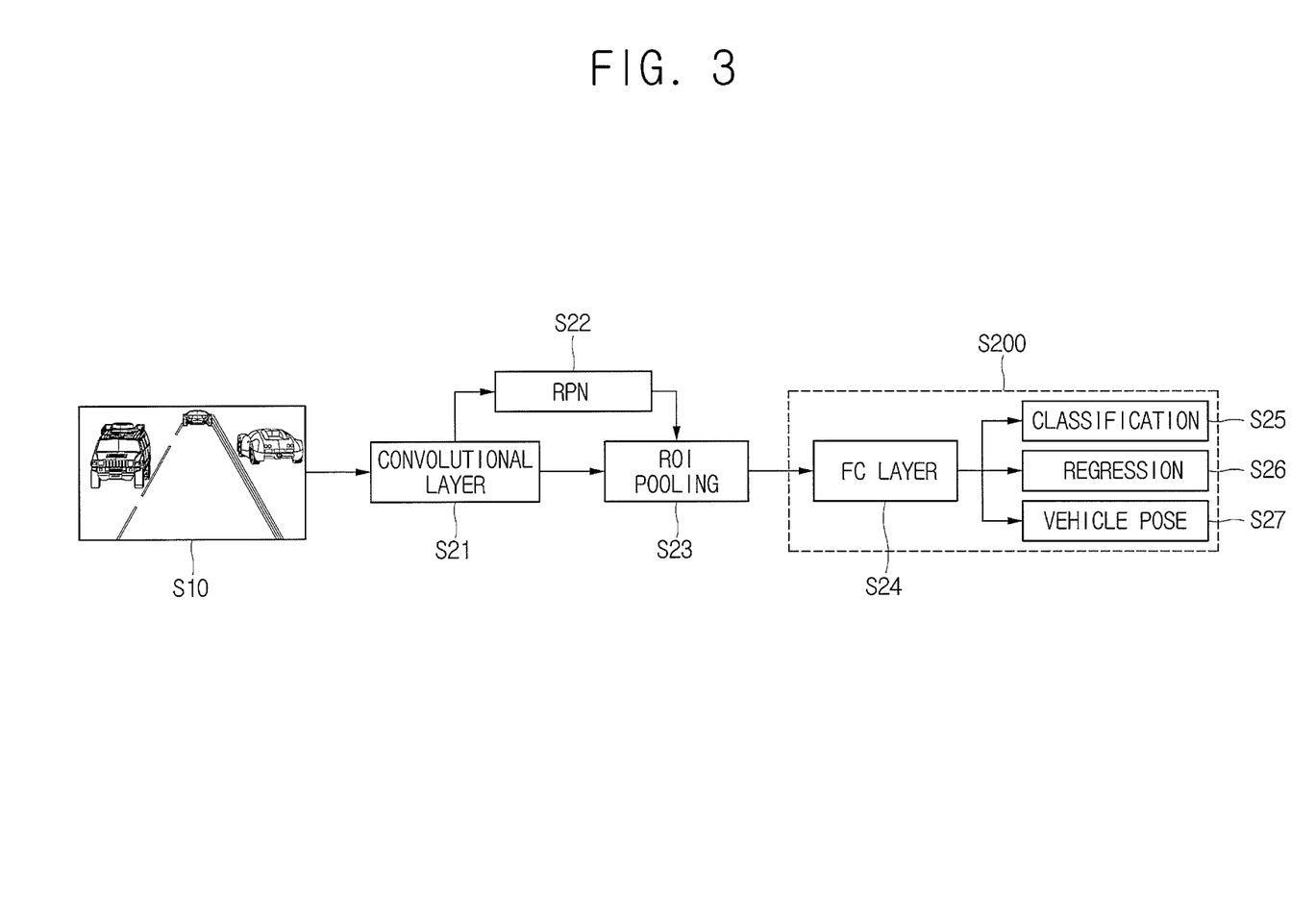
FIG. 3 is a block diagram schematically illustrating a convolutional neural network performing blind spot monitoring in accordance with one example embodiment of the present invention.

First, by referring to FIG. 3, the communication part 110 of the blind spot monitor 100 may acquire the rear video image of the monitoring vehicle 200 from the vision sensor 10 installed on the monitoring vehicle 200 in the driving state through the communication part 110, at the step of S10, and the processor 120 of the blind spot monitor 100 may acquire at least one feature map from the acquired rear video image.

As one example, the processor 120 may perform or support another device to perform processes of (i) inputting the rear video image into a convolutional layer capable of applying at least one convolution operation to the rear video image and then (ii) acquiring the feature map through the convolutional layer, at the step of S21.

Herein, the processor 120 may, on condition that a pad is set at zero, apply or support another device to apply convolution operation to the rear video image or its corresponding feature map, with a filter being slid at a predetermined stride. The pad is used for adjusting a size of output of the convolutional layer and the stride is an amount by which the filter shifts. In other words, the processor 120 may apply convolution operation to the rear video image or its corresponding feature map acquired therefrom to reduce their sizes. As opposed to this, the processor 120, on condition that the convolution is being performed with the pad set at a certain non-zero value, may perform processes of (i) acquiring at least one feature map with a size identical to that of the rear video image, (ii) downsizing the acquired feature map by applying pooling operation, and (iii) creating at least one additional feature map with at least one predetermined size by repeating the convolution and the pooling.

For reference, the processor 120 may perform convolution using the convolutional layer over the whole area of each of the rear video image acquired from the vision sensor 10 or over parts of images corresponding to areas set as the blind spot on the rear video image.

The processor 120 may acquire the m proposal boxes corresponding to the object in the rear video image. As one example, the processor 120 may input or support another device to input the feature map into a region proposal network (RPN) to acquire the m proposal boxes corresponding to the objects in the rear video image at the step of S22.

Thereafter, the processor 120 may perform processes of (i) applying pooling operation to each area, corresponding to the m proposal boxes, on the feature map, and (ii) acquiring each of the feature vectors corresponding to each of the m proposal boxes, at the step of S23.

As one example, the processor 120 may perform processes of (i) inputting each part of the feature map, which corresponds to each of the m proposal boxes, into a region of interest (ROI) pooling layer, (ii) applying max pooling or average pooling operation to said each part, thereby acquiring each of the feature vectors corresponding to each of the m proposal boxes.

Further, the processor 120 may input or support another device to input each of the feature vectors into the first FC layer at the step of S24 to acquire each of the first classification scores for each of the first kinds of the class, at the step of S25.

Further, the processor 120 may acquire each of the second classification scores for each of the second kinds of the class, at the step of S27. Herein, the second kinds of the class may be used for determining the pose of the monitored vehicle, which may correspond to a view of the monitored vehicle seen from the monitoring vehicle 200.

Figure 5:
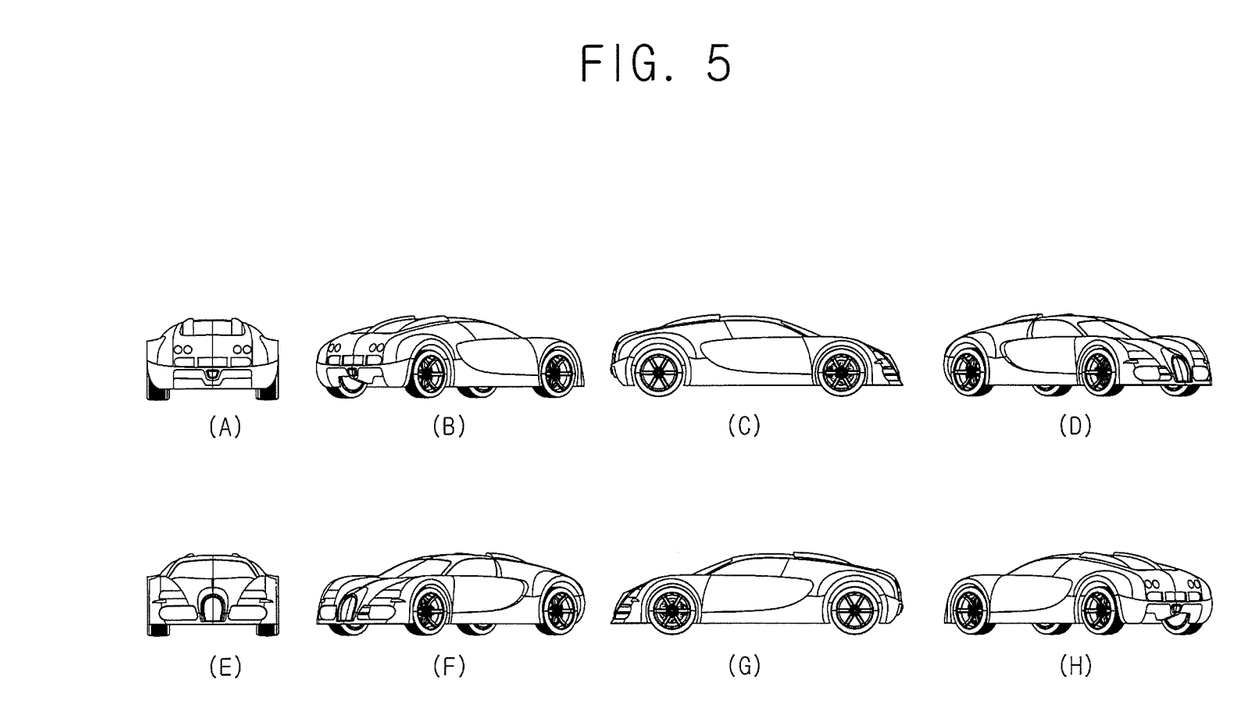
FIG. 5 is a diagram schematically illustrating each of kinds of class regarding poses of a monitored vehicle used in performing blind spot monitoring in accordance with one example embodiment of the present invention.

As one example, by referring to FIG. 5, the details of the second kinds of the class may be shown as follows. The view of the monitored vehicle seen from the monitoring vehicle 200 may be a rear face in case of (a), a rear face to the right in case of (b), a right face in case of (c), a front face to the right in case of (d), a front face in case of (e), a front face to the left in case of (f), a left face in case of (g), and a rear face to the left in case of (h).

In addition to this, the processor 120 may further acquire regression information for each of the first kinds of the class, which corresponds to each of the m proposal boxes, by applying regression operation to the feature vectors through a second FC layer, at the step of S26.

Figure 4:
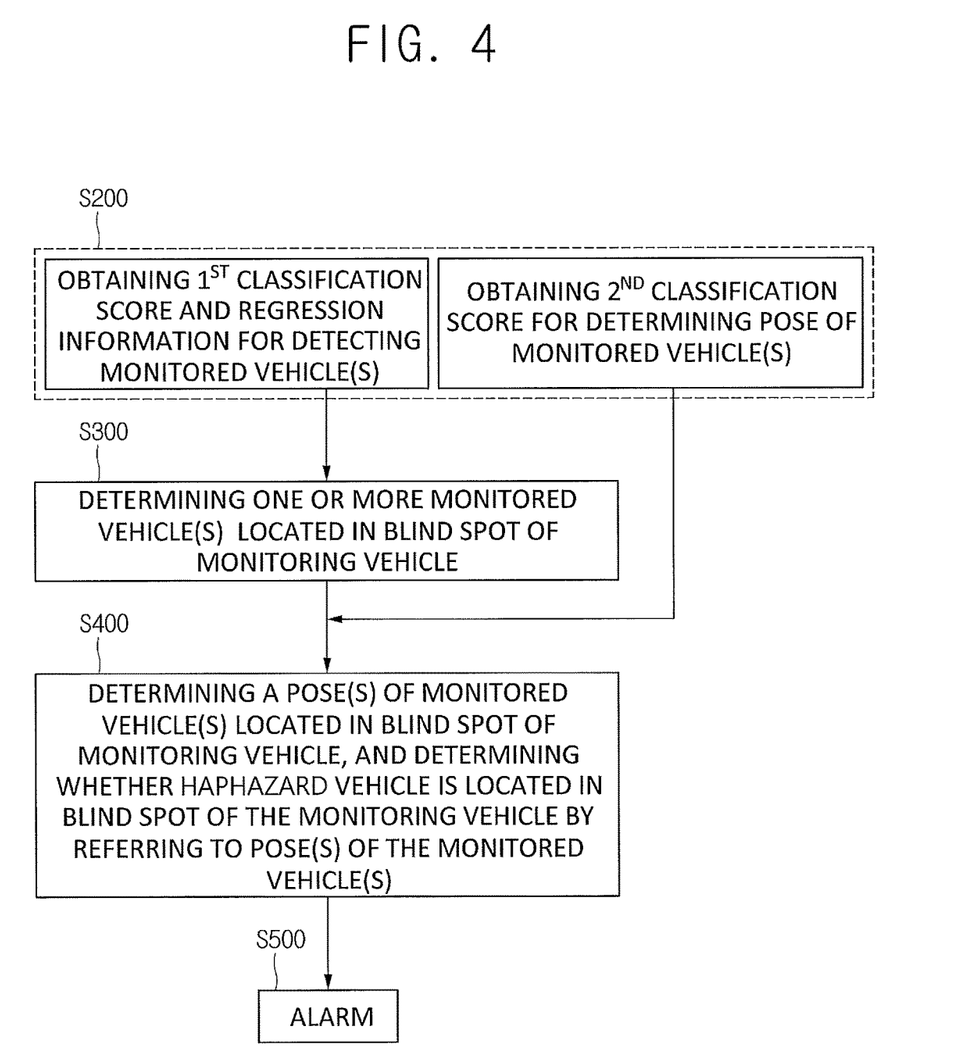
FIG. 4 is a block diagram schematically illustrating a blind spot monitoring method in accordance with one example embodiment of the present invention.

Next, by referring to FIG. 4, the processor 120, on condition that the first classification scores and the regression information for each of the first kinds of the class to detect the monitored vehicle, and the second classification scores to determine the pose of the monitored vehicle are acquired at the step of S200 in FIG. 3, may perform processes of (i) determining the monitored vehicle located in the blind spot of the monitoring vehicle 200 by referring to the first classification scores and the regression information for each of the first kinds of the class, at the step of S300, and (ii) determining whether the haphazard vehicle is located in the blind spot of the monitoring vehicle 200 by referring to the pose of the monitored vehicle located in the blind spot inferred from the second classification scores, at the step of S400.

Specifically, the processor 120 may perform processes of (i) selecting the n proposal boxes among the m proposal boxes by referring to the first classification scores, (ii) acquiring the n bounding boxes, each of which corresponds to each of the n proposal boxes, by referring to the regression information for vehicles which corresponds to each of the n proposal boxes, and (iii) detecting the monitored vehicles located in the rear video image.

Further, specifically, at the step of S300, the processor 120 may determine k bounding boxes in the blind spot among the n bounding boxes corresponding to the monitored vehicles located in the rear video image. The processor 120 may determine that the haphazard vehicle is located in the blind spot if the pose of the monitored vehicle in at least one of the k bounding boxes corresponds to a direction in which the monitoring vehicle is traveling, at the step of S400.

Figure 6:
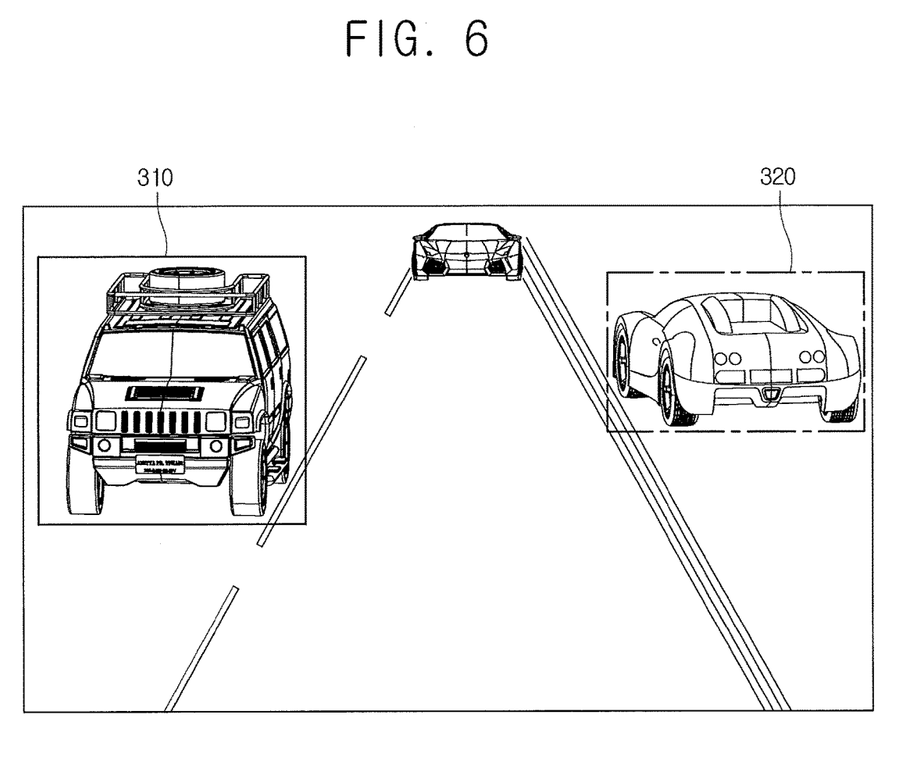
FIG. 6 is a diagram exemplarily illustrating a process of performing blind spot monitoring in accordance with one example embodiment of the present invention.

In detail, by referring to FIG. 6, the processor 120 may perform processes of (i) detecting the monitored vehicles 310 and 320 located in the blind spot of the monitoring vehicle 200 by referring to the first classification scores and the regression information for vehicles, (ii) determining the poses of the detected monitored vehicles 310 and 320. For example, if the poses of the monitored vehicle correspond to the front face, the front face to the left, or the front face to the right like (d), (e), or (f) in FIG. 5, the processor 120 may determine that the monitored vehicle 310 is traveling in a same direction with the monitoring vehicle 200, and thus determine the monitored vehicle 310 as the haphazard vehicle located in the blind spot. As opposed to this, if the pose of the monitored vehicle 320 corresponds to the rear face, the rear face to the right, the right face, the left face, or the rear face to the left like (a), (b), (c), (g), or (h) in FIG. 5, the processor 120 may determine that the monitored vehicle 320 is traveling in a different direction from the monitoring vehicle 200 and thus determine the monitored vehicle 310 as not the haphazard vehicle. In other words, although the monitored vehicle is located in the blind spot, the processor 120 may determine that the monitored vehicle is not the haphazard vehicle, because the monitored vehicle is traveling in an opposite direction to the monitoring vehicle 200.

Further, if (i) a first bounding box among the k bounding boxes is determined as located in the blind spot formed in a back left area apart from the monitoring vehicle 200, and (ii) the view of the monitored vehicle corresponds to the front face or the front face to the left, the processor 120 may determine that the haphazard vehicle is not located in the blind spot. Similarly, if (i) a second bounding box among the k bounding boxes is determined as located in the blind spot formed in a back right area apart from the monitoring vehicle 200, and (ii) the view of the monitored vehicle corresponds to the front face or the front face to the right, the processor 120 may determine that the haphazard vehicle is not located in the blind spot.

Figure 7A:
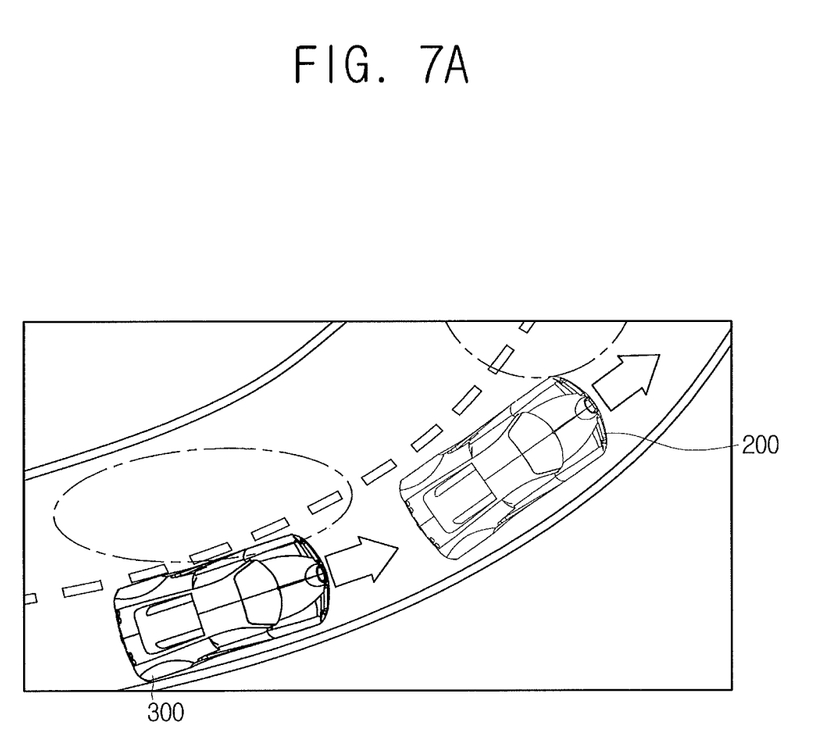
FIGS. 7A and 7B are diagrams exemplarily illustrating blind spot monitoring according to a driving environment of the monitoring vehicle in accordance with one example embodiment of the present invention.
Figure 7B:
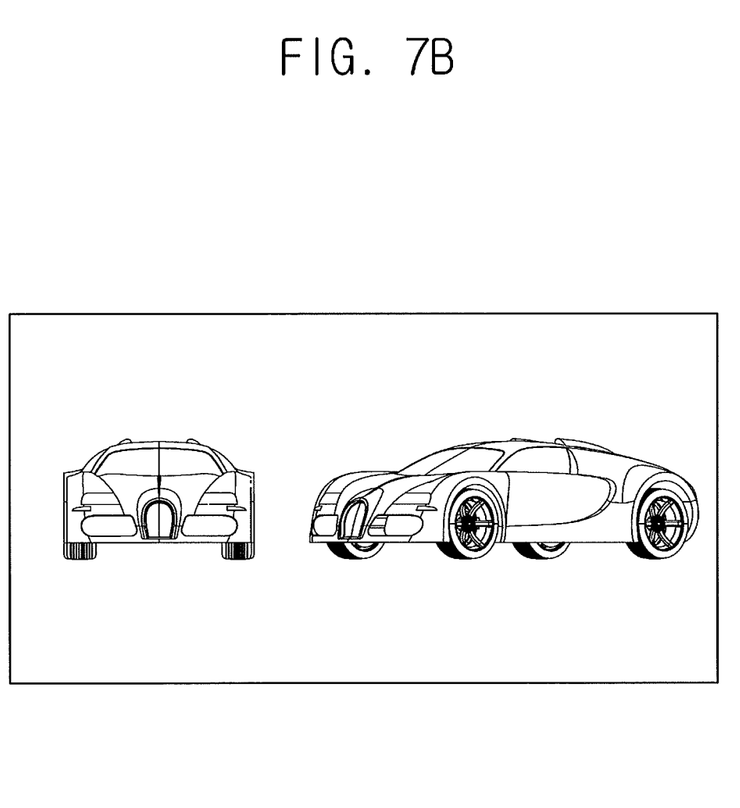

In other words, as in FIG. 7A, if the monitoring vehicle 200 in the driving state is on a left-curved road and the monitored vehicle 300 is following the monitoring vehicle 200 in the same lane, the monitored vehicle 300 may be determined as located in the blind spot in the back left area of the monitoring vehicle 200. However, because the pose of the monitored vehicle 300, as can be seen in FIG. 7B, corresponds to the front face or the front face to the left like (e) or (f) in FIG. 5, the processor 120 may perform processes of confirming that the monitored vehicle 300 is not the haphazard vehicle.

Similarly, if the monitoring vehicle 200 in the driving state is on a right-curved road and the monitored vehicle is following the monitoring vehicle 200 in the same lane, the monitored vehicle may be determined as located in the blind spot formed in the back right area of the monitoring vehicle 200. However, because the pose of the monitored vehicle corresponds to the front face to the right or the front face like (d) or (e) in FIG. 5, the processor 120 may perform processes of confirming that the monitored vehicle 300 is not the haphazard vehicle.

The processor 120 may also perform or support another device to perform processes of (i) calculating first overlap ratios which are pairwise-overlapping ratios among the n bounding boxes, and then determining specific bounding boxes confirmed to have the first overlap ratios equal to or greater than a first threshold among the n bounding boxes as corresponding to a single identical monitored vehicle, (ii) calculating second overlap ratios which are pairwise-overlapping ratios among the specific bounding boxes and their respective corresponding proposal boxes, and then determining a certain bounding box with a maximum ratio among the second overlap ratios as including the single identical monitored vehicle.

As one example, (i) a first overlap ratio of a first bounding box overlapping a second bounding box may be calculated, and (ii) if the calculated first overlap ratio is equal to or greater than the first threshold, a second overlap ratio of the first bounding box overlapping a first proposal box and a third overlap ratio of the second bounding box overlapping a second proposal box may be calculated. Then, if the second overlap ratio is determined to be greater than the third overlap ratio, the first bounding box may be determined as including the monitored vehicle.

Herein, the first overlap ratio may be calculated by dividing an area corresponding to intersection of the first bounding box and the second bounding box by an area corresponding to union of the first bounding box and the second bounding box. Further, the second overlap ratio may be calculated by dividing an area corresponding to intersection of the first bounding box and the first proposal box by an area corresponding to union of the first bounding box and the first proposal box. Furthermore, the third overlap ratio may be calculated by dividing an area corresponding to intersection of the second bounding box and the second proposal box by an area corresponding to union of the second bounding box and the second proposal box.

As another example, the processor 120 may perform processes of (i) calculating the first overlap ratios and (ii) determining particular bounding boxes confirmed to have the first overlap ratios less than a second threshold among the n bounding boxes as including respective monitored vehicles. Herein, the first threshold and the second threshold may be same with or different from each other.

Meanwhile, as mentioned above, the monitored vehicle is determined as located in the blind spot of the monitoring vehicle 200 by referring to the first classification scores and the regression information for vehicles, and then the monitored vehicle is determined as the haphazard vehicle located in the blind spot by referring to the pose of the monitored vehicle. However, as another example, the monitored vehicle may be determined as traveling in the same direction with the monitoring vehicle 200 by referring to the first and the second classification scores, and then the monitored vehicle is determined as the haphazard vehicle located in the blind spot by referring to the regression information for vehicles on the monitored vehicle traveling in the same direction.

In other words, the processor 120 may perform processes of (i) determining specific proposal boxes as including the monitored vehicles, among the m proposal boxes by referring to the first classification scores, (ii) selecting i proposal boxes determined as including at least one of the monitored vehicles whose pose corresponds to the traveling direction of the monitoring vehicle 200 among the specific proposal boxes by referring to the second classification scores. Then, the processor 120 may perform processes of (i) acquiring each of i bounding boxes corresponding to each of the i proposal boxes by referring to the regression information for vehicles which corresponds to each of the i proposal boxes, and (ii) determining whether there is at least one bounding box located in the blind spot of the monitoring vehicle among the i bounding boxes to thereby determine whether at least one haphazard vehicle is located in the blind spot.

Next, by referring to FIG. 4, the processor 120 may support a control unit of the monitoring vehicle 200 to prevent the monitoring vehicle 200 from changing lanes in a direction to the blind spot where the haphazard vehicle is determined as located, by transmitting information on the haphazard vehicle located in the blind spot to the control unit.

Herein, in case the driver intends to change lanes and the haphazard vehicle is detected as being located in the blind spot on the lane into which the driver intends to move, the control unit of the monitoring vehicle 200 may allow the alarm system to warn the driver of the fact that the haphazard vehicle is in the blind spot and may allow the driver to avoid a hazardous situation which may arise from changing lanes, by referring to information on the steering system of the monitoring vehicle 200. Further, if the monitoring vehicle 200 is an autonomous vehicle, the control unit may allow the autonomous vehicle to change lanes safely by referring to information on the driving environment and information on whether the haphazard vehicle is located in the blind spot.

In the above, a process of confirmation of the haphazard vehicle in the blind spot is explained with respect to a single side, however, the confirmation thereof in each blind spot on both sides may be performed by following the same steps for the blind spot in the lane on the other side of the monitoring vehicle 200.

Meanwhile, the blind spot monitor may include a CNN capable of performing operations of the convolution, the first classification, the second classification, and the regression by using at least one convolution parameter, at least one first classification parameter, at least one second classification parameter, and at least one regression parameter adjusted in advance.

Further, the blind spot monitor may be divided into several devices to perform its functions, however, the present specification describes the blind spot monitor implemented as a single device for convenience.

The blind spot monitor in accordance with the present invention may include part of the convolutional layer, the RPN, and the FC layer, etc.

The present invention has an effect of accurately detecting the haphazard vehicle located in the blind spots by using the CNN.

The present invention has another effect of accurately detecting the haphazard vehicle located in the blind spots without regard to the driving environment of the monitoring vehicle.

The present invention has still another effect of detecting the haphazard vehicle located in the blind spots in real-time by less computation without regard to a change of a state of a background and a visual noise.

The present invention has still yet another effect of detecting the haphazard vehicle located in the blind spot, according to the driving environment of the monitoring vehicle and the monitored vehicle.

The present invention has still yet another effect of filtering vehicles in lanes of opposite direction with least computation without a need for lane detection by using a single detection network capable of performing vehicle detection and pose classification simultaneously, as opposed to conventional method of filtering the vehicles in lanes of opposite direction with lane detection which results in more computation and inaccuracy due to many missing lanes.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for monitoring a blind spot of a vehicle, comprising steps of:
   (a) a blind spot monitor acquiring or supporting another device to acquire at least one feature map from a rear video image if the rear video image is acquired from a monitoring vehicle in a driving state;
   (b) the blind spot monitor performing or supporting another device to perform (i) a process of acquiring m proposal boxes corresponding to one or more objects located in the rear video image, (ii) a process of acquiring feature vectors each of which corresponds to each of the m proposal boxes by applying pooling operation to each area, on the feature map, corresponding to the m proposal boxes, and (iii) a process of inputting each of the feature vectors corresponding to each of the m proposal boxes into a first FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects; and (c) the blind spot monitor performing or supporting another device to perform (i) a process of selecting n proposal boxes, which have probabilities over a certain threshold to be regarded as including the monitored vehicle, among the m proposal boxes by referring to the first classification scores, (ii) a process of acquiring n bounding boxes, each of which corresponds to each of the n proposal boxes, by referring to regression information corresponding to each of the n proposal boxes, (iii) a process of determining the pose of the monitored vehicle corresponding to each of at least some of the n bounding boxes by referring to the second classification scores, and (iv) a process of determining whether a haphazard vehicle is located in a blind spot of the monitoring vehicle by referring to at least some of the n bounding boxes and the pose of the monitored vehicle, and wherein, at the step of (c), the blind spot monitor performs or supports another device to perform (i) a process of calculating first overlap ratios which are pairwise-overlapping ratios among the n bounding boxes, (ii) a process of determining specific bounding boxes confirmed to have the first overlap ratios equal to or greater than a first threshold among then-bounding boxes as corresponding to a single identical monitored vehicle, (iii) a process of calculating second overlap ratios which are pairwise-overlapping ratios among the specific bounding boxes and their respective corresponding proposal boxes, and (iv) a process of determining a certain bounding box with a maximum ratio among the second overlap ratios as including the single identical monitored vehicle.

2. The method of claim 1, wherein, at the step of (b), the blind spot monitor performs or supports another device to perform a process of inputting each of the feature vectors corresponding to each of the m proposal boxes into a second FC layer to further acquire (iii-3) regression information for each of the first kinds of class, which corresponds to each of the m proposal boxes, by applying regression operation to the feature vectors through the second FC layer.

3. The method of claim 1, further comprising a step of:
(d) the blind spot monitor supporting a control unit to prevent the monitoring vehicle from changing lanes in a direction to the blind spot where the haphazard vehicle is located by transmitting information on the haphazard vehicle to the control unit if the haphazard vehicle is determined as located in the blind spot.

4. The method of claim 1, wherein, at the step of (c), the blind spot monitor performs or supports another device to perform (i) a process of selecting k bounding boxes determined as located in the blind spot of the monitoring vehicle among the n bounding boxes, and then (ii) a process of determining that the haphazard vehicle is located in the blind spot if the pose of the monitored vehicle in at least one of the k bounding boxes corresponds to a direction in which the monitoring vehicle is traveling.

5. The method of claim 4, wherein the blind spot monitor determines or supports another device to determine that the monitored vehicle is traveling in a same direction with the monitoring vehicle if a view of the monitored vehicle seen from the monitoring vehicle is a front face, a left front face, or a right front face.

6. The method of claim 5, wherein the blind spot monitor determines or supports another device to determine the haphazard vehicle as not located in the blind spot of the monitoring vehicle if (i) first conditions that a first bounding box, among the k bounding boxes, is determined as located in the blind spot formed in a back left area apart from the monitoring vehicle and that the view of the monitored vehicle seen from the monitoring vehicle include the front face or the left front face or (ii) second conditions that a second bounding box, among the k bounding boxes, is determined as located in the blind spot formed in a back right area apart from the monitoring vehicle and that the view of the monitored vehicle seen from the monitoring vehicle include the front face or the right front face are satisfied.

7. The method of claim 1, wherein, at the step of (c), the blind spot monitor performs or supports another device to perform (i) a process of calculating first overlap ratios which represent pairwise-overlapping ratios among the n bounding boxes and (ii) a process of determining particular bounding boxes confirmed to have the first overlap ratios less than a second threshold among the n bounding boxes as including respective monitored vehicles.

8. The method of claim 1, wherein, at the step of (a), the blind spot monitor applies or supports another device to apply convolution operation to the rear video image to thereby acquire the feature map.

9. The method of claim 8, wherein, the blind spot monitor, on condition that a pad is set at zero, applies or supports another device to apply convolution operation to the rear video image or its corresponding feature map, with a filter being slid at a predetermined stride.

10. The method of claim 1, wherein, at the step of (a), the blind spot monitor applies or supports another device to apply convolution operation to a part of the rear video image corresponding to the blind spot to thereby acquire the feature map.

11. A blind spot monitor for monitoring a blind spot of a vehicle, comprising:
a communication part for acquiring or supporting another device to acquire a rear video image or its corresponding at least one feature map, wherein the rear video image is acquired from a monitoring vehicle in a driving state;
a processor for performing or supporting another device to perform (i) a process of acquiring m proposal boxes corresponding to one or more objects located in the rear video image by using the feature map acquired from the communication part or the feature map calculated by applying one or more convolution operations to the rear video image map acquired from the communication part, (ii) a process of acquiring feature vectors each of which corresponds to each of the m proposal boxes by applying pooling operation to each area, on the feature map, corresponding to the m proposal boxes, (iii) a process of inputting each of the feature vectors corresponding to each of the m proposal boxes into a first FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects, (iv) a process of selecting n proposal boxes, which have probabilities over a certain threshold to be regarded as including the monitored vehicle, among the m proposal boxes by referring to the first classification scores, (v) a process of acquiring n bounding boxes, each of which corresponds to each of the n proposal boxes, by referring to regression information corresponding to each of the n proposal boxes, (vi) a process of determining the pose of the monitored vehicle corresponding to each of at least some of the n bounding boxes by referring to the second classification scores, and (vii) a process of determining whether a haphazard vehicle is located in a blind spot of the monitoring vehicle by referring to at least some of the n bounding boxes and the pose of the monitored vehicle, and wherein, between the processes of (v) and (vi), the processor performs or supports another device to perform a process of calculating first overlap ratios which are pairwise-overlapping ratios among the n bounding boxes; a process of determining specific bounding boxes confirmed to have the first overlap ratios equal to or greater than a first threshold among the n bounding boxes as corresponding to a single identical monitored vehicle; a process of calculating second overlap ratios which are pairwise-overlapping ratios among the specific bounding boxes and their respective corresponding proposal boxes; and a process of determining a certain bounding box with a maximum ratio among the second overlap ratios as including the single identical monitored vehicle.

12. The blind spot monitor of claim 11, wherein, at the process of (iii), the processor performs or supports another device to perform a process of inputting each of the feature vectors corresponding to each of the m proposal boxes into a second FC layer to further acquire (iii-3) regression information for each of the first kinds of class, which corresponds to each of the m proposal boxes, by applying regression operation to the feature vectors through the second FC layer.

13. The blind spot monitor of claim 11, wherein the processor further performs a process of supporting a control unit to prevent the monitoring vehicle from changing lanes in a direction to the blind spot where the haphazard vehicle is located by transmitting information on the haphazard vehicle to the control unit if the haphazard vehicle is determined as located in the blind spot.

14. The blind spot monitor of claim 11, wherein, at the processes of (vi) and (vii), the processor performs or supports another device to perform a process of selecting k bounding boxes determined as located in the blind spot of the monitoring vehicle among the n bounding boxes, and then a process of determining that the haphazard vehicle is located in the blind spot if the pose of the monitored vehicle in at least one of the k bounding boxes corresponds to a direction in which the monitoring vehicle is traveling.

15. The blind spot monitor of claim 14, wherein the processor determines or supports another device to determine that the monitored vehicle is traveling in a same direction with the monitoring vehicle if a view of the monitored vehicle seen from the monitoring vehicle is a front face, a left front face, or a right front face.

16. The blind spot monitor of claim 15, wherein the processor determines or supports another device to determine the haphazard vehicle as not located in the blind spot of the monitoring vehicle if (i) first conditions that a first bounding box, among the k bounding boxes, is determined as located in the blind spot formed in a back left area apart from the monitoring vehicle and that the view of the monitored vehicle seen from the monitoring vehicle include the front face or the left front face or (ii) second conditions that a second bounding box, among the k bounding boxes, is determined as located in the blind spot formed in a back right area apart from the monitoring vehicle and that the view of the monitored vehicle seen from the monitoring vehicle include the front face or the right front face are satisfied.

17. The blind spot monitor of claim 11, wherein, at the process of (v), the processor performs or supports another device to perform a process of calculating first overlap ratios which represent pairwise-overlapping ratios among the n bounding boxes and a process of determining particular bounding boxes confirmed to have the first overlap ratios less than a second threshold among the n bounding boxes as including respective monitored vehicles.

18. The blind spot monitor of claim 11, wherein the processor applies or supports another device to apply convolution operation to the rear video image to thereby acquire the feature map.

19. The blind spot monitor of claim 18, wherein, the processor, on condition that a pad is set at zero, applies or supports another device to apply convolution operation to the rear video image or its corresponding feature map, with a filter being slid at a predetermined stride.

20. The blind spot monitor of claim 11, wherein the processor applies or supports another device to apply convolution operation to a part of the rear video image corresponding to the blind spot to thereby acquire the feature map.

21. A method for monitoring a blind spot of a vehicle, comprising steps of:
(a) a blind spot monitor acquiring or supporting another device to acquire at least one feature map from a rear video image if the rear video image is acquired from a monitoring vehicle in a driving state;
(b) the blind spot monitor performing or supporting another device to perform (i) a process of acquiring m proposal boxes corresponding to one or more objects located in the rear video image, (ii) a process of acquiring feature vectors each of which corresponds to each of the m proposal boxes by applying pooling operation to each area, on the feature map, corresponding to the m proposal boxes, and (iii) a process of inputting each of the feature vectors corresponding to each of the m proposal boxes into an FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects; and
(c) the blind spot monitor performing or supporting another device to perform (i) a process of determining specific proposal boxes as including the monitored vehicles among the m proposal boxes by referring to the first classification scores for each of first kinds of class, (ii) a process of selecting i proposal boxes determined as including at least one specific monitored vehicle whose pose corresponds to a traveling direction of the monitoring vehicle among the specific proposal boxes by referring to the second classification scores for each of the second kinds of class, (iii) a process of acquiring each of i bounding boxes corresponding to each of the i proposal boxes by referring to regression information corresponding to each of the i proposal boxes, and (iv) a process of determining whether there is at least one bounding box located in the blind spot of the monitoring vehicle among the i bounding boxes to thereby determine whether at least one haphazard vehicle is located in the blind spot, and wherein, at the step of (c), the blind spot monitor performs or supports another device to perform (i) a process of calculating first overlap ratios which are pairwise-overlapping ratios among the i bounding boxes, (ii) a process of determining specific bounding boxes confirmed to have the first overlap ratios equal to or greater than a first threshold among the i bounding boxes as corresponding to a single identical monitored vehicle, (iii) a process of calculating second overlap ratios which are pairwise-overlapping ratios among the specific bounding boxes and their respective corresponding proposal boxes, and (iv) a process of determining a certain bounding box with a maximum ratio among the second overlap ratios as including the single identical monitored vehicle.

22. The method of claim 21, wherein, at the step of (b), the blind spot monitor performs or supports another device to perform a process of inputting each of the feature vectors corresponding to each of the m proposal boxes into the FC layer to further acquire (iii-3) regression information for each of the first kinds of class corresponding to each of the m proposal boxes, by applying regression operation to the feature vectors through the FC layer.

23. The method of claim 21, wherein, at the step of (c), the blind spot monitor determines or supports another device to determine that the monitored vehicles are traveling in a same direction with the monitoring vehicle if views of the monitored vehicles seen from the monitoring vehicle include a front face, a left front face, or a right front face.

24. The method of claim 23, wherein the blind spot monitor determines or supports another device to determine the haphazard vehicle as not located in the blind spot of the monitoring vehicle if (i) first conditions that a first bounding box, among the i bounding boxes, is determined as located in the blind spot formed in a back left area apart from the monitoring vehicle, and that the views of the monitored vehicles seen from the monitoring vehicle include the front face or the left front face or (ii) second conditions that a second bounding box, among the i bounding boxes, is determined as located in the blind spot formed in a back right area apart from the monitoring vehicle, and that the views of the monitored vehicles seen from the monitoring vehicle include the front face or the right front face are satisfied.

25. A blind spot monitor for monitoring a blind spot of a vehicle, comprising:
a communication part for acquiring or supporting another device to acquire a rear video image or its corresponding at least one feature map, wherein the rear video image is acquired from a monitoring vehicle in a driving state;
a processor for performing or supporting another device to perform (i) a process of acquiring m proposal boxes corresponding to one or more objects located in the rear video image by using the feature map acquired from the communication part or the feature map calculated by applying one or more convolution operations to the rear video image map acquired from the communication part, (ii) a process of acquiring feature vectors each of which corresponds to each of the m proposal boxes by applying pooling operation to each area, on the feature map, corresponding to the m proposal boxes, (iii) a process of inputting each of the feature vectors corresponding to each of the n proposal boxes into an FC layer to acquire (iii-1) each of first classification scores for each of first kinds of class, which correspond to each of the m proposal boxes, to confirm whether the objects are monitored vehicles, and (iii-2) each of second classification scores for each of second kinds of class, which correspond to each of the m proposal boxes, to confirm poses of the objects, (iv) a process of determining specific proposal boxes as including the monitored vehicles among the m proposal boxes by referring to the first classification scores for each of first kinds of class, (v) a process of selecting i proposal boxes determined as including at least one specific monitored vehicle whose pose corresponds to a traveling direction of the monitoring vehicle among the specific proposal boxes by referring to the second classification scores for each of the second kinds of class, (vi) a process of acquiring each of i bounding boxes corresponding to each of the i proposal boxes by referring to regression information corresponding to each of the i proposal boxes, and (vii) a process of determining whether there is at least one bounding box located in the blind spot of the monitoring vehicle among the i bounding boxes to thereby determine whether at least one haphazard vehicle is located in the blind spot, and wherein, between the processes of (v) and (vi), the processor performs or supports another device to perform a process of calculating first overlap ratios which are pairwise-overlapping ratios among the i bounding boxes; a process of determining specific bounding boxes confirmed to have the first overlap ratios equal to or greater than a first threshold among the i bounding boxes as corresponding to a single identical monitored vehicle; a process of calculating second overlap ratios which are pairwise-overlapping ratios among the specific bounding boxes and their respective corresponding proposal boxes; and a process of determining a certain bounding box with a maximum ratio among the second overlap ratios as including the single identical monitored vehicle.

26. The blind spot monitor of claim 25, wherein, at the process of (iii), the process performs or supports another device to perform a process of inputting each of the feature vectors corresponding to each of the m proposal boxes into the FC layer to further acquire (iii-3) regression information for each of the first kinds of class corresponding to each of the m proposal boxes, by applying regression operation to the feature vectors through the FC layer.

27. The blind spot monitor of claim 25, wherein, at the process of (v), the processor determines or supports another device to determine that the monitored vehicles are traveling in a same direction with the monitoring vehicle if views of the monitored vehicles seen from the monitoring vehicle include a front face, a left front face, or a right front face.

28. The blind spot monitor of claim 27, wherein the processor determines or supports another device to determine the haphazard vehicle as not located in the blind spot of the monitoring vehicle if first conditions that a first bounding box, among the i bounding boxes, is determined as located in the blind spot formed in a back left area apart from the monitoring vehicle, and that the views of the monitored vehicles seen from the monitoring vehicle include the front face or the left front face or if second conditions that a second bounding box, among the i bounding boxes, is determined as located in the blind spot formed in a back right area apart from the monitoring vehicle, and that the views of the monitored vehicles seen from the monitoring vehicle include the front face or the right front face are satisfied.

\* \* \* \* \*